UNITED STATES PATENT OFFICE.

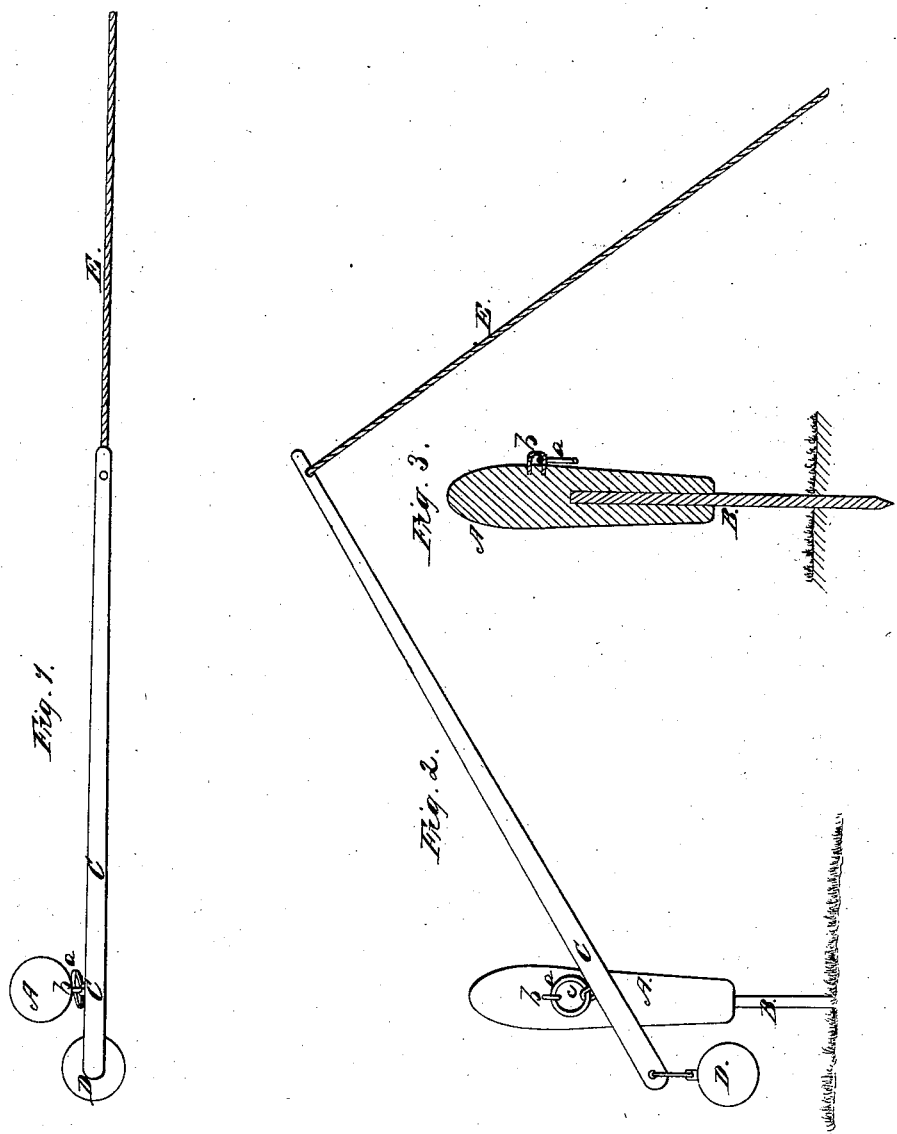

MOSES JOHNSON, OF COLEBROOK, NEW HAMPSHIRE.

DEVICE FOR TETHERING ANIMALS.

Specification forming part of Letters Patent No. 40,755, dated December 1, 1863.

*To all whom it may concern:*

Be it known that I, MOSES JOHNSON, a resident of Colebrook, in the county of Coos, of the State of New Hampshire, have made a new and useful invention for Tethering an Animal; and I do hereby declare the same to be fully described in the following specification and represented in the accompanying drawings, of which—

Figure 1 is a top view, and Fig. 2 a side elevation, of it. Fig. 3 is a vertical section of its swivel as applied to a post or round bar or a crowbar set up in the ground.

The nature of my invention consists in a combination consisting of a post or swivel, a lever and weight, the same being arranged and combined and with a stationary bar and a tethering line or chain, substantially in manner as hereinafter described, the purpose of the said invention being to prevent an animal when tethered from becoming entangled in the tethering rope or chain.

In the drawings, A denotes the swivel or swiveling post, it being bored axially about one-half its length, so as to receive, encompass, and turn on an iron rod or bar, B, projecting vertically from the ground at the central part or space on which it may be desirable to allow an animal to graze. There is suspended to the swivel A by means of a ring, *a*, and two staples, *b c*, a pole or lever, C, one of the staples being driven into the swivel A and the other into the pole or lever. An overbalancing-weight, D, is suspended from the larger end of the pole or lever, the tethering-rope E, when attached to an animal, being fastened at one end to the other extremity of it, the whole being as shown in the drawings. The weight should be sufficiently heavy to raise the pole or lever into a vertical or nearly vertical position, with the tethering-line attached to it, and the length of the pole may be about equal to the tethering-rope. As the animal may move around the bar B, the swiveling post A will revolve freely on the latter by reason of the draft created on the pole or lever by the animal. As the animal may depart from the said post A, the lever will be depressed, and as he may approach the post the lever will rise, the weight and the lever co-operating to so control the tethering-line as to keep it elevated more or less out of the way of the animal or its legs. In case the animal, by moving closely around the post, should twist the tethering-line one or more times around the lever, the coils will be drawn off the same while he may be receding from the pole in a direction of its length. With my said invention it would be difficult, if not impossible, to entangle the tethering-rope about the animal.

I claim—

The said tethering apparatus, made substantially in manner and so as to operate as described.

MOSES JOHNSON.

Witnesses:
R. H. EDDY,
F. P. HALE, Jr.